May 7, 1929.  T. E. PARROTT  1,711,903

GREASE GUN

Filed Feb. 4, 1925

Inventor
Thomas E. Parrott.
By *[signature]*
Attorney

Patented May 7, 1929.

1,711,903

UNITED STATES PATENT OFFICE.

THOMAS E. PARROTT, OF CLAREMORE, OKLAHOMA, ASSIGNOR TO ALEMITE MANUFACTURING CORPORATION, OF CHICAGO, ILLINOIS, A CORPORATION OF DELAWARE.

GREASE GUN.

Application filed February 4, 1925. Serial No. 6,739.

This invention relates to new and useful improvements in grease guns, and particularly to that class of grease guns which are adapted for use in supplying grease to the bearings of motor vehicles.

One object of the invention is to provide a grease gun whereby grease can be properly forced into a bearing which has become clogged by the rusting of the ball valve of the nipple of the bearing.

Another object is to provide a device of this character by means of which the bearing nipples or fittings may be reached by the grease gun, from various angles.

Another object is to provide a grease gun of such construction that the initial operating pressure exerted thereon will force the grease to the bearing, and the subsequent pressure exert an additional force whereby to effectively drive the grease into the bearing.

Other objects and advantages will be apparent from the following description when taken in connection with the accompanying drawing.

Figure 1:
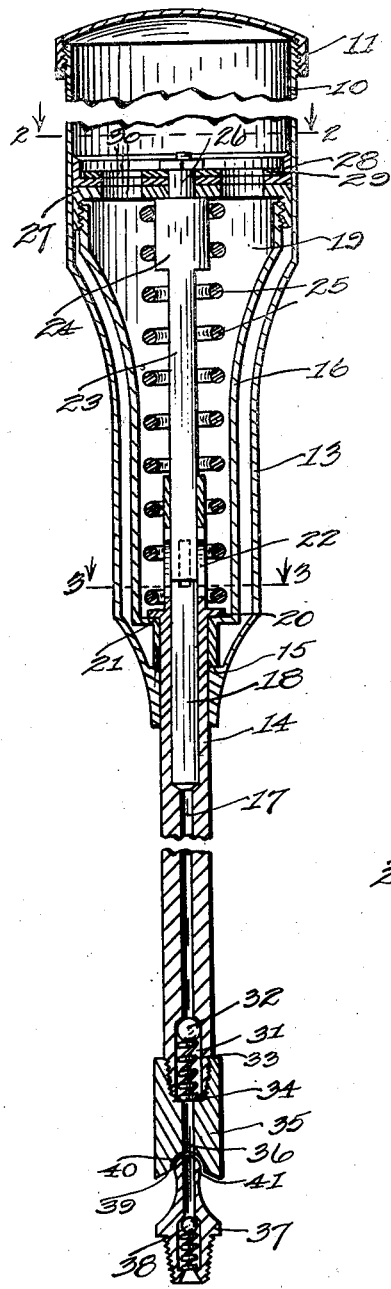
Figure 1 is a vertical longitudinal sectional view through a grease gun made in accordance with the present invention, and in initial operating position.
Figure 4:
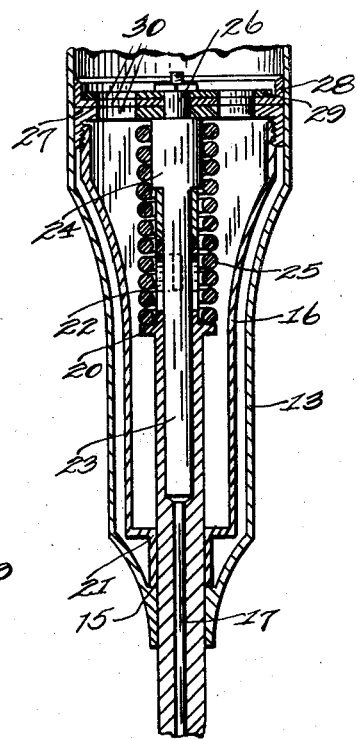
Figure 4 is a vertical longitudinal sectional view showing the final or forcing position of the parts.
Figure 2:
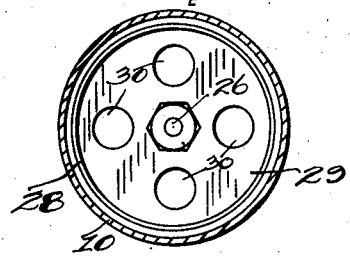
Figure 2 is a horizontal sectional view on the line 2—2 of Figure 1.
Figure 3:
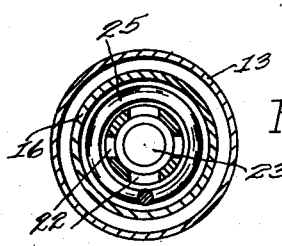
Figure 3 is a horizontal sectional view on the line 3—3 of Figure 1.

Referring particularly to the accompanying drawing, 10 represents the barrel of the grease gun, which has the screw closure 11 on its upper end. The lower end of the barrel is tapered, as shown at 13, and is slidably telescoped on the tube 14. Within the smaller end of the barrel there is formed a ledge or shoulder 15, on which rests the lower smaller end of the tapered plunger or piston 16. Throughout the length of the tube 14 there is formed the bore 17, the upper end portion of which is of larger diameter than the main portion thereof, as shown at 18, said upper end of the tube being slidably received through the lower end of the piston 16, and into the chamber 19, formed within said piston. The portion of the tube, within the said chamber 19, is formed with a peripheral flange 20 which rests on the shoulder 21, formed in the smaller end of the piston 16, by means of which upward movement of the piston is limited, under the upward force of the spring 25. In the sides of the tube 14, above the flange 20, there are formed the elongated slots 22, which establish communication between the interior of the chamber 19 and the upper portion 18 of the bore. Slidably disposed in the upper end of the bore is a plunger stem 23, the upper end of which is formed with a shouldered head 24. Encircling the said upper portion of the tube 14, and the said stem 23, and bearing at its opposite ends against the flange 20, and a disk head 27, is a coil spring 25, which urges the stem upwardly, to uncover the slots 22. The upper end of the head 24 is reduced in diameter, as shown at 26, and disposed on this portion 26 is a centrally apertured disk 27, the periphery of which bears in close relation to the wall of the barrel 10, and is threaded onto the upper end of the chamber 19. Also secured on this portion 26 is a cup washer 28, and a washer disk 29, the former of which snugly engages with the wall of the barrel. Formed through the washers and the disk 27, are the circular series of openings 30, which provide passages for the grease to flow from the barrel into the chamber 19, as will be explained later herein.

The lower end of the bore 17 is slightly enlarged in diameter, as shown at 31, and seated within this portion of the bore is a ball valve 32, said valve being yieldably held to its seat by the coil spring 33, which engages with the ball, and with a shoulder 34, formed in said portion of the bore, below the seat. Removably engaged on the lower end of the tube 14 is a nipple, or nozzle, 35, and formed longitudinally through this nipple is a passage 36, which alines with the bore 17, for passage of grease into the automobile fitting 37, which fitting is provided with a spring pressed ball valve 38. The lower end of the nipple is formed with a depression 39 and in the center of this depression there is formed a spherical socket 40 for the reception of the ball head 41 of the fitting 37, and whereby the grease gun may be disposed at any angle to inject grease into the fitting.

It will be noted that the lower, or smaller ends of the barrel and chamber closely embrace the tube 14.

Assuming the parts to be in the position shown in Figure 1, and the barrel filled with suitable grease, the operator engages the nipple with the automobile fitting and presses downwardly on the barrel, which barrel slides downwardly on the tube 14. This brings the grease into engagement with the upper side of the piston and the grease contained therein, whereupon grease is forced through the openings 30, into the chamber 19, and thence through the slots 22, into the bore 17, filling this bore, and the bores of the nipple 35 and the fitting 37. It ordinarily requires considerable pressure to force the grease into the fitting, by reason of the fact that the ball valve 38 is sometimes rusted or gummed to its seat. When this condition exists, the barrel will slide downwardly on the tube 14 until the chamber 19, and the bores of the tube 14, and nipple and fitting are completely filled with grease, under comparatively high pressure, when said barrel will stop. Further pressure on the barrel causes the piston 16 to move, simultaneously with the barrel, when the stem 23 will move downwardly in the portion 18 of the bore 17, thus exerting an additional pressure on the grease already in the bore, and forcing same to unseat the valve 38, whereupon the grease passes into the bearing.

Thus the initial downward movement of the barrel places a charge of grease in proper position for passage into the bearing, while the final movement causes the grease to be forced past the valve of the fitting and into the bearing.

Upon withdrawing pressure from the barrel, the spring 25 forces the plunger 16 upwardly into its normal position, uncovering the slots 22, so that a new charge of grease can be forced into the tube 14, upon the next initial downward movement of the barrel.

What is claimed is:

1. A grease gun including a barrel, a discharge tube slidable in the barrel, a hollow piston in the barrel and slidably receiving the tube, said tube having communication with the piston, a high pressure plunger carried by said piston and slidably operative in said tube, and means between the tube and piston yieldably maintaining communication between the tube and piston.

2. A grease gun including a barrel, a discharge tube, a hollow piston slidable within the barrel and slidably receiving an end of the tube, said tube having a grease passage and an inlet opening establishing communication between the passage and the interior of the piston, said piston having communication with the interior of the barrel, a plunger carried by the piston and operable in said passage for expelling the grease therefrom and for controlling said inlet opening, and means operable upon the tube and piston normally maintaining the plunger in uncovering relation to the said passage.

3. A grease gun including a barrel, a hollow piston slidable in the barrel, a discharge tube slidable in the barrel and piston and having communication with the interior of the piston, a stem carried by the piston and slidably arranged within the tube, and resilient means between the piston and tube for yieldably maintaining the said communication open.

4. A grease gun including a barrel having a tapered end, a hollow piston slidable in the barrel and having a tapered end lying within the tapered end of the barrel, a stem carried within the piston, a tube having one end slidable within the tapered ends of the piston and barrel and receiving said stem slidably within the upper end of the bore thereof, said upper end of the tube having openings communicating with the interior of the piston and said bore, and a resilient means between the piston and tube.

5. A grease gun including a barrel, a hollow piston in the barrel, a discharge tube slidable in the barrel and piston and having communication with the interior of the piston, the piston having a stem slidable in the tube, and a spring between the tube and piston whereby upon initial pressure on the barrel will fill the piston and tube with grease, and the final pressure will move the stem in the tube to discharge the grease from the tube.

6. A lubricant compressor comprising a tube adapted to abut a receiving fitting, a high pressure piston slidable into the opposite end of said tube, a low pressure piston slidable on and defining a chamber opening into said tube, said high pressure piston being carried by said low pressure piston, resilient means acting between said low pressure piston and said tube to hold the high pressure piston out of the tube, and a low pressure cylinder sliding over said low pressure piston, said low pressure piston having apertures connecting its chamber with the low pressure cylinder, whereby delivery may be made at low pressure up to a predetermined pressure, above which said resilient means will let the low pressure piston slide on the tube to move the high pressure piston into the same.

7. A lubricant compressor comprising a tube adapted to abut a receiving fitting, a high pressure piston slidable into the opposite end of said tube, a low pressure piston slidable and defining a chamber opening into said tube, said high pressure piston being carried by said low pressure piston, resilient means acting between said tube and low pressure piston to hold the high pressure piston out of the tube, and means co-operating with said low pressure piston for developing low pressure therein.

8. Lubricating equipment comprising low pressure compressing means including a low pressure cylinder and piston, high pressure compressing means supported and guided by said low pressure piston, said low pressure piston having a long bearing in its cylinder, said high pressure means, in the position of rest, lying open and forming a discharge outlet for said low pressure means, and connections for actuating both compressing means by a single thrust transmitted hydraulically through said low pressure and mechanically through said high pressure means, said connections including resilient means under initial tension for holding said high pressure means in the position of rest up to a predetermined thrust.

9. A lubricant compressor comprising a barrel, high pressure compressing means mounted in said barrel, said compressing means including a telescoping discharge nozzle guided in and projecting from one end of said barrel, low pressure compressing means in said barrel discharging into and mounted on said high pressure compressing means and mechanically actuated thereby, and resilient means rendering said high pressure means inoperative until said low pressure means develops a predetermined pressure.

10. A lubricant compressor comprising a barrel, high pressure compressing means mounted in said barrel, said compressing means including a telescoping discharge nozzle guided in and projecting from one end of said barrel, and low pressure compressing means in said barrel discharging into and mounted on said high pressure compressing means and mechanically actuated thereby.

11. A lubricant compressor comprising a tube adapted to abut a receiving fitting, a high pressure piston slidable into the opposite end of said tube, a low pressure piston slidable on and defining a chamber opening into said tube, said high pressure piston being carried by said low pressure piston, resilient means acting between said tube and low pressure piston to hold the high pressure piston out of the tube, and a low pressure cylinder sliding over said low pressure piston.

12. Lubricating equipment comprising low pressure compressing means including a low pressure cylinder and piston, and high pressure compressing means supported solely by said low pressure piston and communicating with said low pressure means, said low pressure piston having a long bearing in its cylinder.

13. Lubricating equipment comprising low pressure compressing means including a low pressure cylinder and piston, high pressure compressing means supported solely by said low pressure piston and communicating with said low pressure means, and connections for actuating both compressing means by a single thrust, said low pressure piston having a long bearing in its cylinder.

14. A lubricant compressor comprising a cylindrical reservoir, an axially bored high pressure delivery tube extending out of one end of said reservoir and slidable with respect thereto, said tube supplied from said reservoir, a confining piston in said reservoir, a resilient lost motion connection between said confining piston and said delivery tube, and means carried by said confining piston to co-operate with said tube upon such relative movement to compress lubricant to a high pressure, said connection comprising a spring encircling said tube, abutments on said tube and confining piston, and a cap housing said spring and limiting the separation of said abutments.

15. A lubricant compressor comprising a cylindrical reservoir, an axially bored high pressure delivery tube extending out of one end of said reservoir and slidable with respect thereto, said tube supplied from said reservoir, a confining piston in said reservoir, a resilient lost motion connection between said confining piston and said delivery tube, and means carried by said confining piston to co-operate with said tube upon such relative movement to compress lubricant to a high pressure, said connection comprising a spring encircling said tube, an abutment on the end of said tube, and a second abutment carried by said confining piston.

16. A lubricant compressor comprising a cylindrical reservoir, an axially bored high pressure delivery tube extending out of one end of said reservoir, said delivery tube adapted to be placed in communication with said reservoir and movable relatively thereto, a confining piston in said reservoir, a resilient lost motion connection between said confining piston and said delivery tube, and means carried by said confining piston to cooperate with said tube upon such relative movement to compress lubricant to a high pressure.

17. A lubricant compressor comprising a cylindrical reservoir, an axially bored high pressure delivery tube extending out of one end of said reservoir, said delivery tube adapted to be placed in communication with said reservoir and movable relatively thereto, a confining piston in said reservoir, a resilient lost motion connection between said confining piston and said delivery tube, and means carried by said confining piston to co-operate with said tube upon such relative movement to compress lubricant to a high pressure, said connection comprising a spring encircling said tube, and abutments on said tube and confining piston.

18. A lubricant compressor comprising a reservoir, a high pressure delivery tube movable relatively to said reservoir and supplied therefrom, a confining piston in said reservoir, and a resilient lost motion connection between said confining piston and said delivery tube.

19. A lubricant compressor comprising a reservoir, a reciprocable delivery tube supplied therefrom, a confining piston in said reservoir, a resilient lost motion connection between said confining piston and said delivery tube, and means carried by said confining piston to co-operate with said tube upon such relative movement to compress lubricant to a high pressure.

20. A lubricant compressor comprising a reservoir, a delivery tube supplied therefrom, a confining piston in said reservoir, a resilient lost motion connection between said confining piston and said delivery tube, and means carried by said confining piston to co-operate with said tube upon such relative movement to compress lubricant to a high pressure, said confining piston being actuated by the hydraulic pressure of the confined lubricant when the reservoir is moved relative to the delivery tube.

In testimony whereof, I affix my signature.

THOMAS E. PARROTT.